A. BOYD.
RIVET.

No. 105,031. Patented July 5, 1870.

Witnesses:
Oscar L. Greene
J. E. Maynadier

Inventor:
Alex. Boyd

UNITED STATES PATENT OFFICE.

ALEXANDER BOYD, OF BOSTON, MASSACHUSETTS.

IMPROVEMENT IN RIVETS.

Specification forming part of Letters Patent No. 105,031, dated July 5, 1870.

*To all whom it may concern:*

Be it known that I, ALEXANDER BOYD, of Boston, in the county of Suffolk and State of Massachusetts, have invented a new and useful Rivet, of which the following is a specification.

Figure 1:
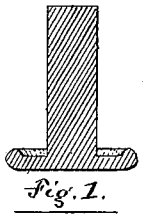
Figure 4:
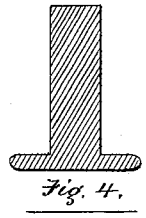
Figure 5:
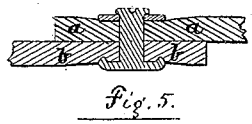
Figure 2:
Figure 6:
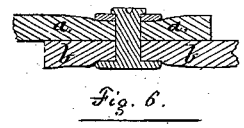
Figure 3:
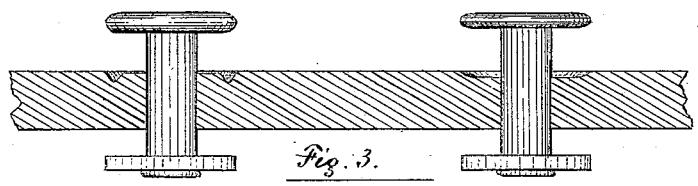

In the drawings, Figure 1 is a section of my improved rivet. Fig. 2 is a plan of the inner face of the head. Fig. 3 is a side view of one of my rivets and one of the kind heretofore used, showing the impression made by the head on the leather or other material. Fig. 4 is a section of a rivet of the kind heretofore commonly used in the manufacture of hose, for which manufacture my rivet is especially intended, and Figs. 5 and 6 are for illustration.

Heretofore the rivets used in the manufacture of hose have been usually formed as shown in Fig. 4 and on the right of Fig. 3, the inner face of the head being plain; and my invention consists in forming a projection upon the inner face of the head, so that a depression shall be made in the material by the projection and a compressed ridge of the material shall lie between this projection and the shank of the rivet when the rivet is in use.

In the drawings the projection shown is annular and continuous, and is placed as far from the shank as the size of the head admits. The drawings, Figs. 1, 2, 3, and 4, are made twice the size of the rivets used for hose, in order to show the projection more clearly.

The object of my invention is to make the hose stronger.

It will be seen that the two edges of the material, when riveted together to form a hose by the rivets commonly used, (see Fig. 6,) are held together against internal pressure principally by the shanks of the rivets. Thus when internal pressure is applied to the hose the inner lap, $b$, Fig. 6, is prevented from tearing along the line of the rivets by the force of cohesion of the fibers and the slight friction between the heads of the rivets and this lap, while the outer lap, $a$, is prevented from thus tearing, not only by this cohesion and this slight friction, but also by friction with the inner end of the lap $b$, which is forced up against it by the internal pressure. Consequently it invariably happens, when the material is homogeneous, that the hose breaks by the tearing of the lap $b$ along the line of rivet-holes when the common rivets are used; and the main purpose of my invention was to strengthen the hose at this point, and I have succeeded so completely that hose made with my rivets, with a homogeneous material, will never break at this point, but always by tearing the lap $a$, Fig. 5, along the line of rivets, the reason being that the annular projection on the rivet-head is forced so firmly into the material as to compress the fibers and force them into a compressed ridge between the shank and the projection, and thus make it very much more difficult to tear the lap along the line of rivet-holes. In fact, hose made with my rivets will bear at least thirty per centum more internal pressure than when made with the rivets shown in Fig. 4, the material being equally good in each case.

In order to operate to the best advantage, the projection should be blunt and continuous, and of an annular form.

I claim as my invention—

As a new article of manufacture, the improved rivet, constructed as above described.

ALEX. BOYD.

Witnesses:
 OSCAR P. GREENE,
 J. E. MAYNADIER.